(12) United States Patent
Ootaki

(10) Patent No.: US 12,368,638 B2
(45) Date of Patent: Jul. 22, 2025

(54) COMMUNICATION DEVICE, METHOD FOR CONTROLLING COMMUNICATION DEVICE, AND RECORDING MEDIUM HAVING CONTROL PROGRAM RECORDED THEREON

(71) Applicant: NEC Corporation, Tokyo (JP)

(72) Inventor: Kazuhiro Ootaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 18/266,485

(22) PCT Filed: Dec. 22, 2020

(86) PCT No.: PCT/JP2020/048014
§ 371 (c)(1),
(2) Date: Jun. 9, 2023

(87) PCT Pub. No.: WO2022/137355
PCT Pub. Date: Jun. 30, 2022

(65) Prior Publication Data
US 2024/0031220 A1    Jan. 25, 2024

(51) Int. Cl.
*H04L 41/0803* (2022.01)
*H04L 41/085* (2022.01)

(52) U.S. Cl.
CPC ........ *H04L 41/0803* (2013.01); *H04L 41/085* (2013.01)

(58) Field of Classification Search
CPC ............. G06F 11/1666; G06F 11/1417; G06F 9/4401; G06F 9/4408; G06F 9/445; G11C 29/74; H04L 41/0803; H04L 41/085; H04L 41/0806; H04L 41/0853
See application file for complete search history.

(56) References Cited

U.S. PATENT DOCUMENTS

2007/0022175 A1* 1/2007 Lu ................. G06F 11/2294
709/217
2008/0288767 A1* 11/2008 Wang ............ G06F 11/1417
713/2

(Continued)

FOREIGN PATENT DOCUMENTS

JP        2000-165431 A    6/2000
JP        2010-009487 A    1/2010

(Continued)

OTHER PUBLICATIONS

"IEEE Standard for Boot (Initialization Configuration) Firmware: Core Requirements and Practices," in IEEE Std 1275-1994 ,vol., No., pp. 1-262, Oct. 28, 1994 (Year: 1994).*

(Continued)

*Primary Examiner* — Messeret F Gebre
(74) *Attorney, Agent, or Firm* — Sughrue Mion, PLLC

(57) ABSTRACT

A communication device includes a control circuit and a main circuit. The control circuit is provided with a first storage circuit which can store, as first setting information, setting information that is information to be used when the communication device is activated. The main circuit is provided with a second storage circuit which can store setting information as second setting information. When valid first setting information can be acquired from the first storage circuit, the first setting information is selected as activation information to be used for activating the communication device, and the communication device is activated using the activation information. When valid first setting information cannot be acquired from the first storage circuit, the second setting information stored in the second storage circuit is selected as the activation information, and the communication device is activated using the activation information.

15 Claims, 9 Drawing Sheets

(56) References Cited

U.S. PATENT DOCUMENTS

| | | | | |
|---|---|---|---|---|
| 2008/0320181 | A1* | 12/2008 | Lauterbach | G06F 9/4416 |
| | | | | 710/36 |
| 2010/0125752 | A1* | 5/2010 | Chen | G06F 11/2284 |
| | | | | 714/E11.055 |
| 2013/0305027 | A1* | 11/2013 | Jiang | G06F 11/1417 |
| | | | | 713/2 |
| 2015/0143095 | A1 | 5/2015 | Maity et al. | |
| 2018/0293187 | A1* | 10/2018 | Radhakrishnan | ... G06F 13/4068 |
| 2022/0179746 | A1* | 6/2022 | Lin | G06F 11/3692 |

FOREIGN PATENT DOCUMENTS

| | | |
|---|---|---|
| JP | 2010-147803 A | 7/2010 |
| JP | 2015-088123 A | 5/2015 |
| JP | 2017-146695 A | 8/2017 |

OTHER PUBLICATIONS

Yuasa, T., & Mishina, H. (2001). Intelligent printing system with AMPAC: Boot program for printing machine with AMPAC Retrieved from https://dialog.proquest.com/professional/docview/831853885?accountid=131444 (Year: 2001).*

G. Singh, K. Bipin and R. Dhawan, "Optimizing the boot time of Android on embedded system," 2011 IEEE 15th International Symposium on Consumer Electronics (ISCE), Singapore, 2011, pp. 503-508 (Year: 2011).*

International Search Report for PCT Application No. PCT/JP2020/048014, mailed on Mar. 23, 2021.

English translation of Written opinion for PCT Application No. PCT/JP2020/048014, mailed on Mar. 23, 2021.

* cited by examiner

COMMUNICATION DEVICE, METHOD FOR CONTROLLING COMMUNICATION DEVICE, AND RECORDING MEDIUM HAVING CONTROL PROGRAM RECORDED THEREON

This application is a National Stage Entry of PCT/JP2020/048014 filed on Dec. 22, 2020, the contents of all of which are incorporated herein by reference, in their entirety.

TECHNICAL FIELD

The present invention relates to a communication device, a method for controlling a communication device, and a recording medium having a control program recorded thereon, more particularly to a communication device including a function of being activated according to setting information, a method for controlling such a communication device, and a recording medium having a control program recorded thereon.

BACKGROUND ART

FIG. 9 is a block diagram illustrating a configuration example of a general communication system 900 relating to the present invention. The communication system 900 includes a communication device 910 and a management device 920. The communication device 910 and the management device 920 are communicably connected to each other. The communication device 910 includes a processing unit 911 and a storage unit 912. The storage unit 912 stores setting information to be used for activating the communication device 910.

At a time of activating the communication device 910, the processing unit 911 reads out the setting information from the storage unit 912. The processing unit 911 activates the communication device 910, based on the setting information. However, when the setting information stored in the storage unit 912 is not valid, the processing unit 911 accesses the management device 920, and thus downloads setting information relating to the communication device 910 from the management device 920. The downloaded setting information is stored in the storage unit 912. Then, the processing unit 911 uses the downloaded setting information and activates the communication device 910.

With regard to the present invention, PTL 1 describes a technique of selecting a boot system according to setting information relating to a basic input output system (BIOS).

CITATION LIST

Patent Literature

PTL 1: Japanese Unexamined Patent Application Publication No. 2010-009487

SUMMARY OF INVENTION

Technical Problem

In a case of the communication device 910 described in FIG. 9, the setting information is stored only in the storage unit 912 inside the communication device 910. Thus, when the device is activated in a state in which the setting information stored in the storage unit 912 cannot be referred to for some reason, the communication device 910 is activated based on the setting information stored in the management device 920.

Herein, when the setting information stored in the management device 920 and the setting information stored in the storage unit 912 do not match with each other, there may be a risk of activating the communication device 910 by unintended setting and failing to implement an expected function of the communication device 910. In particular, in some cases, when the management device is remotely arranged, it is difficult to maintain the setting information stored in the management device 920 and the setting information stored in the communication device 910 as identical information at all time.

OBJECT OF INVENTION

An object of the present invention is to provide a technique for suppressing activation of a communication device that is caused by unintended setting information.

Solution to Problem

A communication device according to the present invention includes a control circuit and a main circuit, wherein
the control circuit includes a first storage means for storing, as first setting information, setting information being information to be used at a time of activating the communication device,
the main circuit includes a second storage means for storing the setting information as second setting information,
when the first setting information being valid can be acquired from the first storage means, the first setting information is selected as activation information to be used for activating the communication device, and activation is performed by using the activation information, and,
when the first setting information being valid cannot be acquired from the first storage means, the second setting information stored in the second storage means is selected as the activation information, and activation is performed by using the activation information.

A method for controlling a communication device according to the present invention includes procedures of
storing, as first setting information in a first storage means, setting information being information to be used at a time of activating a communication device and storing the setting information as second setting information in a second storage means,
selecting the first setting information as activation information to be used for activating the communication device and activating the communication device by using the activation information when the first setting information being valid can be acquired from the first storage unit, and
selecting, as the activation information, the second setting information stored in the second storage means and activating the communication device by using the activation information when the first setting information being valid cannot be acquired from the first storage means.

A recording medium for a control program according to the present invention records a control program for causing a computer to execute:
a procedure of selecting first setting information as activation information to be used for activating a communication device, and activating the communication device by using the activation information, when the first setting information being valid can be acquired from a first storage means for storing, as the first setting information, setting information being information to be used at a time of activating the communication device; and a procedure of selecting, as the activation information, second setting information stored in a second storage means for storing the setting information as second setting information, and activating the communication device by using the activation information, when the first setting information being valid cannot be acquired from the first storage means.

Advantageous Effects of Invention

The present invention enables suppression of activation of a communication device that is caused by unintended setting information.

EXAMPLE EMBODIMENTS

Figure 1:
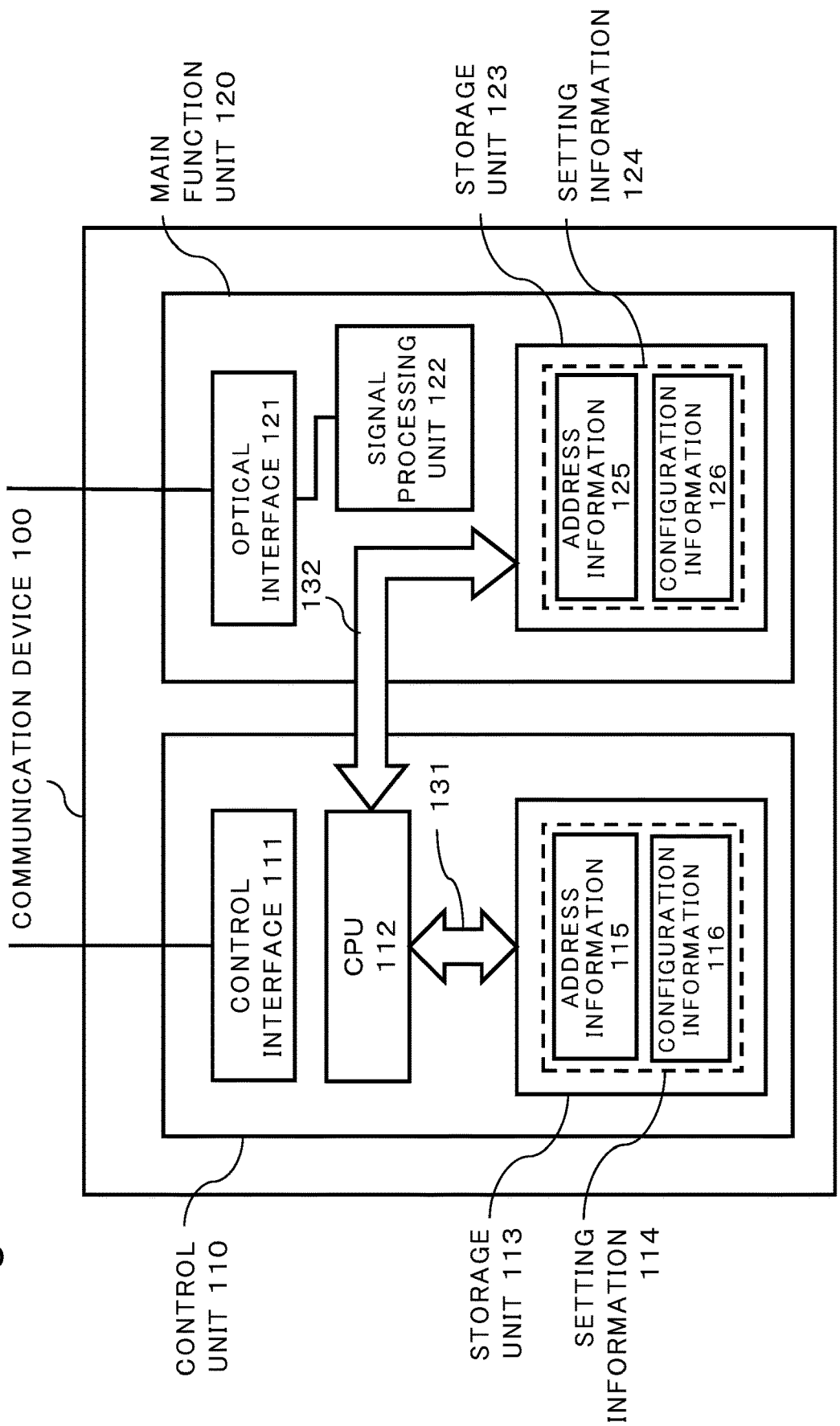
FIG. 1 is a block diagram illustrating a configuration example of a communication device 100 of a first example embodiment.

With reference to the drawings, example embodiments according to the present invention are described below. The arrows illustrated in the drawings exemplarily illustrate signal directions or processing orders, but are not intended to limit those matters. In the example embodiments and the drawings, aforementioned elements are denoted with the identical reference symbols, and overlapping description therefor is omitted.

First Example Embodiment

FIG. 1 is a block diagram illustrating a configuration example of a communication device 100 of a first example embodiment according to the present invention. The communication device 100 includes a control unit 110 and a main function unit 120. The control unit 110 includes a control interface 111, a central processing unit (CPU) 112, and a storage unit 113. The main function unit 120 includes an optical interface 121, a signal processing unit 122, and a storage unit 123. The CPU 112 is connected to the storage units 113 and 123 via data buses 131 and 132.

The control interface 111 is an optical-signal or electric-signal interface that enables the communication device 100 to transmit and receive a signal containing control information or setting information with an external management device or another communication device. The control interface 111 may include an interface connected to an external management device and an interface connected to another communication device as independent communication units. The storage unit 113 stores setting information 114 relating to the communication device 100.

The storage unit 113 is a non-volatile storage element, and is capable of maintaining the stored information even when the communication device 100 is turned off or the CPU 112 is reset. The setting information 114 includes address information 115 and configuration information 116. The address information 115 is information relating to an address of the control interface 111. The address is an Internet protocol (IP) address, for example. The configuration information 116 is information for setting, to the communication device 100 and another communication device connected to the communication device 100 via the control interface 111, a function specified for each of the communication devices. The address information 115 and the configuration information 116 are stored as data in the storage unit 113.

The optical interface 121 is an optical-signal interface that enables the communication device 100 to transmit and receive an optical signal containing user data (hereinafter, referred to as a "main signal") with another communication device or another network, and may include an optical connector. The signal processing unit 122 directly subjects the main signal being an optical signal to processing, or converts the main signal into an electric signal and then subjects the electric signal to processing. For example, the signal processing unit 122 includes one or more functions including a function of amplifying an input main signal, a function of wavelength-multiplexing a plurality of main signals, and a function of demultiplexing the wavelength-multiplexed main signals into a plurality of main signals in different wavelength bands. The main function unit 120 subjects the main signal input from the optical interface 121, to any one of the processing functions, and outputs the processed main signal from the optical interface 121 to the outside of the communication device 100. The functions of the optical interface 121 and the signal processing unit 122 are general functions that the communication device 100 may include, and are not limited to the above-mentioned functions. Further, the functions of the optical interface 121 and the signal processing unit 122 are not directly relevant to the present invention. Thus, in the other block diagrams, description for the optical interface 121 and the signal processing unit 122 is omitted.

The storage unit 123 stores setting information 124 relating to the communication device 100. The storage unit 123 is a non-volatile storage element, and is capable of maintaining the stored information even when the communication device 100 is turned off or the CPU 112 is reset. The setting information 124 includes address information 125 and configuration information 126. The address information 125 is information relating to an address of the control interface 111. The address is an IP address, for example. The configuration information 126 is information for setting a function to the communication device 100 and another communication device connected to the communication device 100 via the control interface 111. The address information 125 and the configuration information 126 are described as data that may be stored in the storage unit 123.

When an activation sequence of the communication device 100 is executed, the CPU 112 reads the setting information from at least one of the storage units 113 and 123, and determines validity of the read setting information. When the setting information is normally read from the storage unit 113 or 123, and the setting information is normal, the CPU 112 may determine that the read setting information is valid. Alternatively, when there is no abnormality in the address information 115, the CPU 112 may determine that the setting information 114 is valid. When there is no abnormality in the address information 125, the CPU 112 may determine that the setting information 124 is valid.

The CPU 112 selects one of the valid setting information 114 and the valid setting information 124 as activation information. Subsequently, the CPU 112 activates the communication device 100, according to the selected activation information. It is preferred that the setting information 114 and the setting information 124 be configured from identical data. For example, during initialization setting work for the communication device 100, the setting information 114 in the storage unit 113 may be copied to the storage unit 123. Further, the setting information 114 and the setting information 124 may be information that enables the communication device 100 to implement the identical function. In those cases, when any one of the setting information 114 and the setting information 124 is used for activating the communication device 100, the function that is set to the communication device 100 is identical. However, the function of the communication device 100 that is implemented by each of the setting information 114 and the setting information 124 is only required not to cause any hindrance onto the service provided by the communication device 100. In other words, the function that is set to the communication device 100 by the setting information 114 and the function that is set to the communication device 100 by the setting information 124 are not required to be identical to each other. In other words, there may be a known functional difference between the setting information 114 and the setting information 124 without causing any hindrance onto the operation of the communication device 100.

Figure 2:
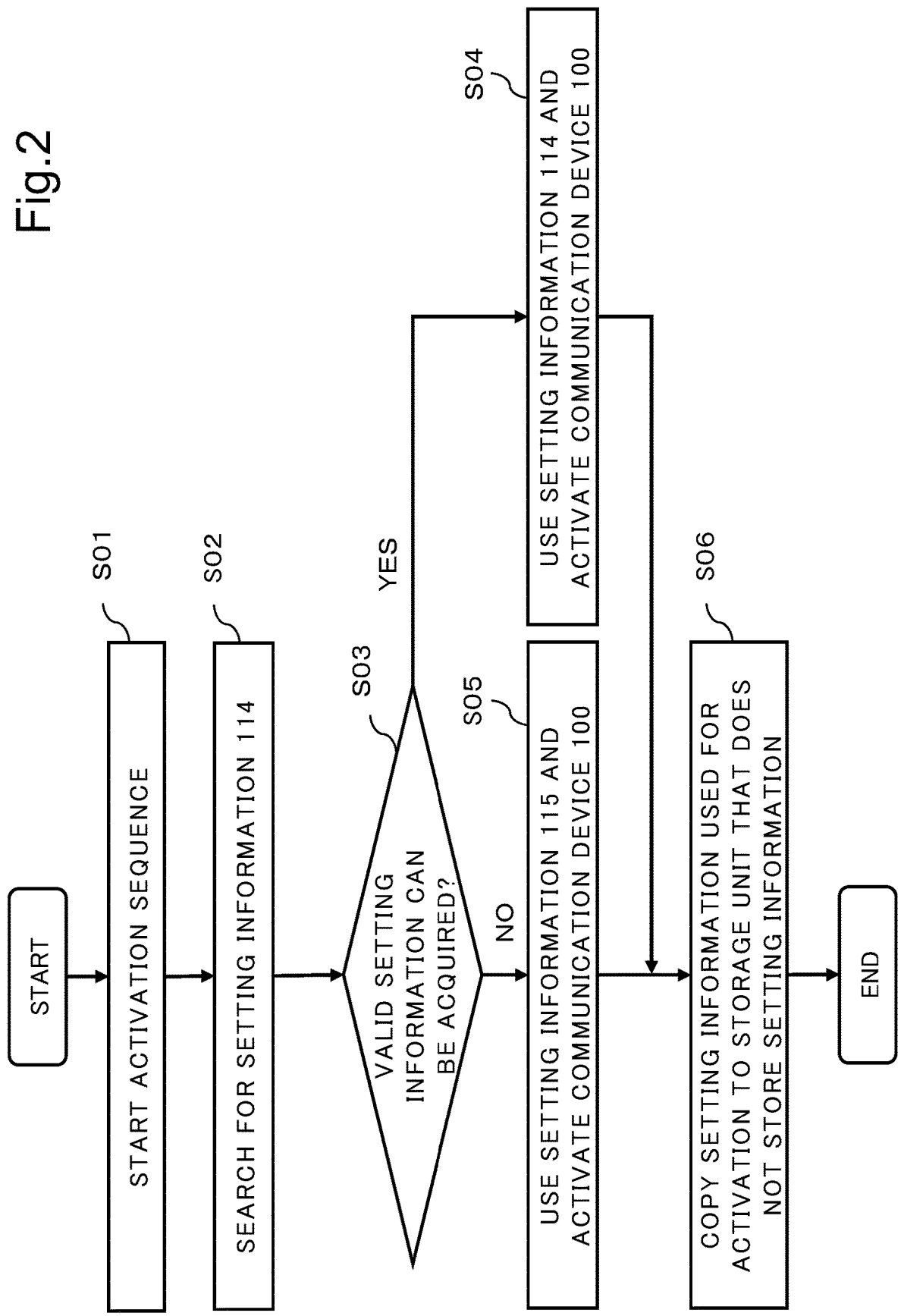
FIG. 2 is a flowchart illustrating an operation example of the communication device 100.

FIG. 2 is a flowchart illustrating an operation example of the communication device 100. When the activation sequence of the communication device 100 is started (Step S01 in FIG. 2), the CPU 112 searches for the setting information 114 stored in the storage unit 113 (Step S02). A trigger for starting the activation sequence is, for example, resetting the CPU 112 or turning on the communication device 100. When the CPU 112 is able to acquire the valid setting information 114 from the storage unit 113 (Step S03: YES), the CPU 112 selects the setting information 114 as information (activation information) to be used for activating the communication device 100. In other words, the CPU 112 uses the setting information 114 to activate the communication device 100 (Step S04). At the time of activation by the setting information 114, an address of the control interface 115 is set based on the address information 115, and the function of the communication device 100 is set based on the configuration information 116. For example, the configuration information 116 sets the functions of the optical interface 121 and the signal processing unit 122.

When the CPU 112 cannot acquire the valid setting information from the storage unit 113 (Step S03: NO), the CPU 112 selects the setting information 124 as the activation information. In other words, the CPU 112 uses the setting information 124 to activate the communication device 100 (Step S05). When the valid setting information 124 cannot be read out in Step S05, the CPU 112 may terminate the activation sequence.

The CPU 112 copies the setting information that is used for activating the communication device 100, to the storage unit that does not store the setting information (Step S06). For example, when the setting information 114 stored in the storage unit 113 is used for activating the communication device 100, the CPU 112 copies the setting information 114 to the storage unit 123. With this, the setting information 124 that is stored in the storage unit 123 until then is overwritten by the setting information 114. The setting information 114 copied to the storage unit 123 is regarded as the setting information 124 thereafter. The identical setting information is stored in the storage unit 113 and the storage unit 123 in the procedure in Step S06, and hence the communication device 100 is able to be activated based on the identical setting even when the setting information in any one of the storage units is used for activating the communication device 100 thereafter.

As described above, in the communication device 100, the setting information 114 is stored in the storage unit 113, and the setting information 124 is stored in the storage unit 123. Any one of the setting information 114 and the setting information 124 is information for specifying the function of the communication device 100. The information for setting the function of the communication device 100 is stored as the setting information 114 and the setting information 124 in the storage units 113 and 123, and hence, even when one of the setting information 114 and the setting information 124 cannot be read out, the other one may be used to activate the communication device 100.

In the procedure described above, the CPU 112 first confirms validity of the setting information 114 in the storage unit 113. However, the CPU 112 may first determine validity of the setting information 124 in the storage unit 123, and may use the setting information 114 to activate the communication device 100 when the setting information 124 is not valid. Further, the procedure for searching for the setting information may differ according to the trigger for causing the activation sequence. For example, validity of the setting information 114 may be determined first when the communication device 100 is turned on, and validity of the setting information 124 may be determined first when the CPU is reset.

The communication device 100 thus configured is capable of suppressing activation of the communication device by unintended setting information. The reason for this is because, as the setting information to be used for activation is stored in the storage units 113 and 123 in the communication device, the communication device 100 is able to be activated by the setting information stored in any one of the storage units.

Second Example Embodiment

Figure 3:
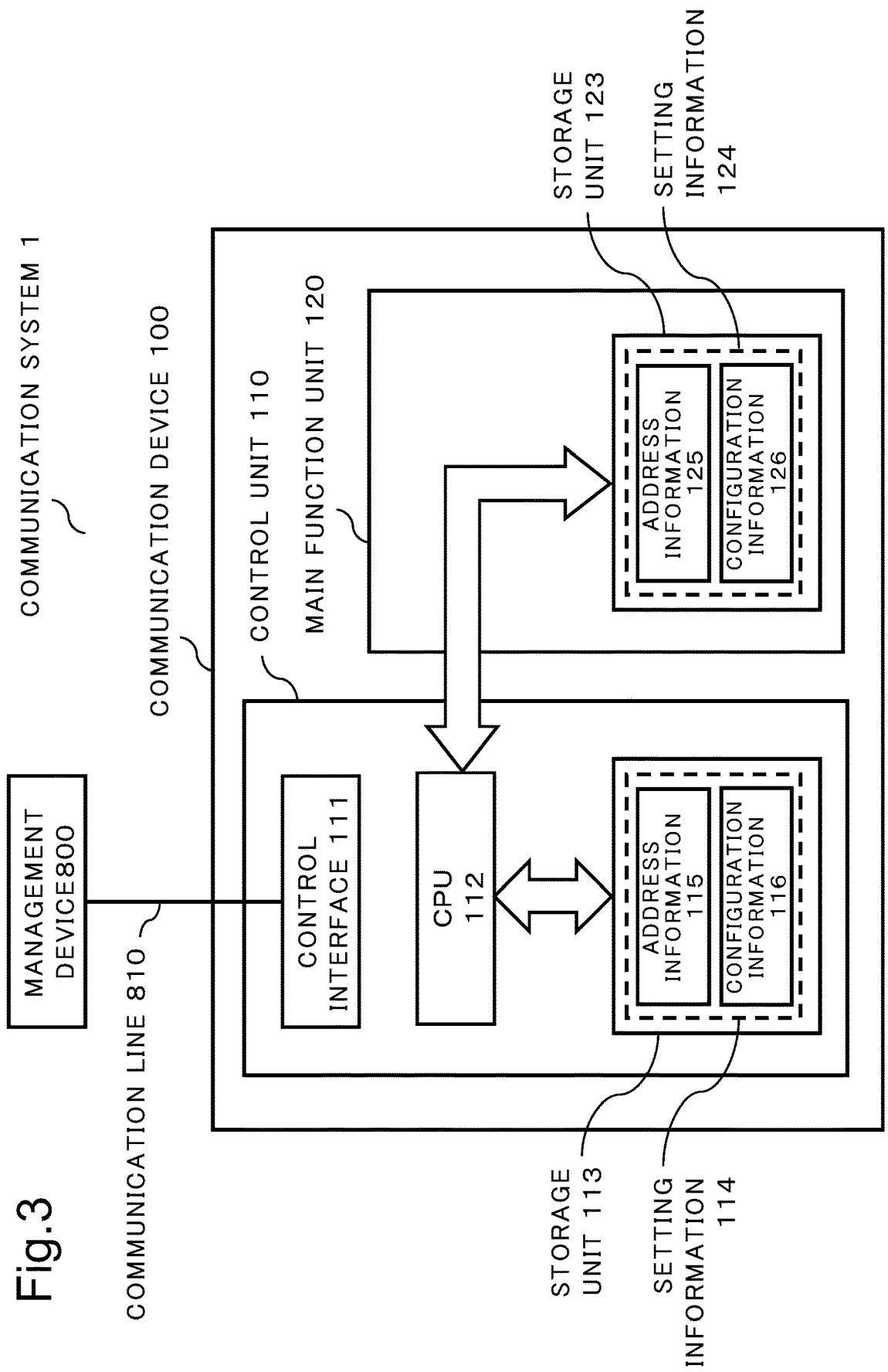
FIG. 3 is a block diagram illustrating a configuration example of a communication system 1 of a second example embodiment.

FIG. 3 is a block diagram illustrating a configuration example of a communication system 1 of a second example embodiment according to the present invention. The communication system 1 includes a communication device 100 and a management device 800. The communication device 100 of the present example embodiment is different from the communication device 100 of the first example embodiment by being connected to the management device 800 via a control interface 111 and a communication line 810.

The management device 800 is capable of operating the communication device 100 by transmitting an instruction or data to the communication device 100. For example, the management device 800 is capable of writing setting information stored in the management device 800, in one of or both of storage units 113 and 123 in the communication device 100.

Figure 4:
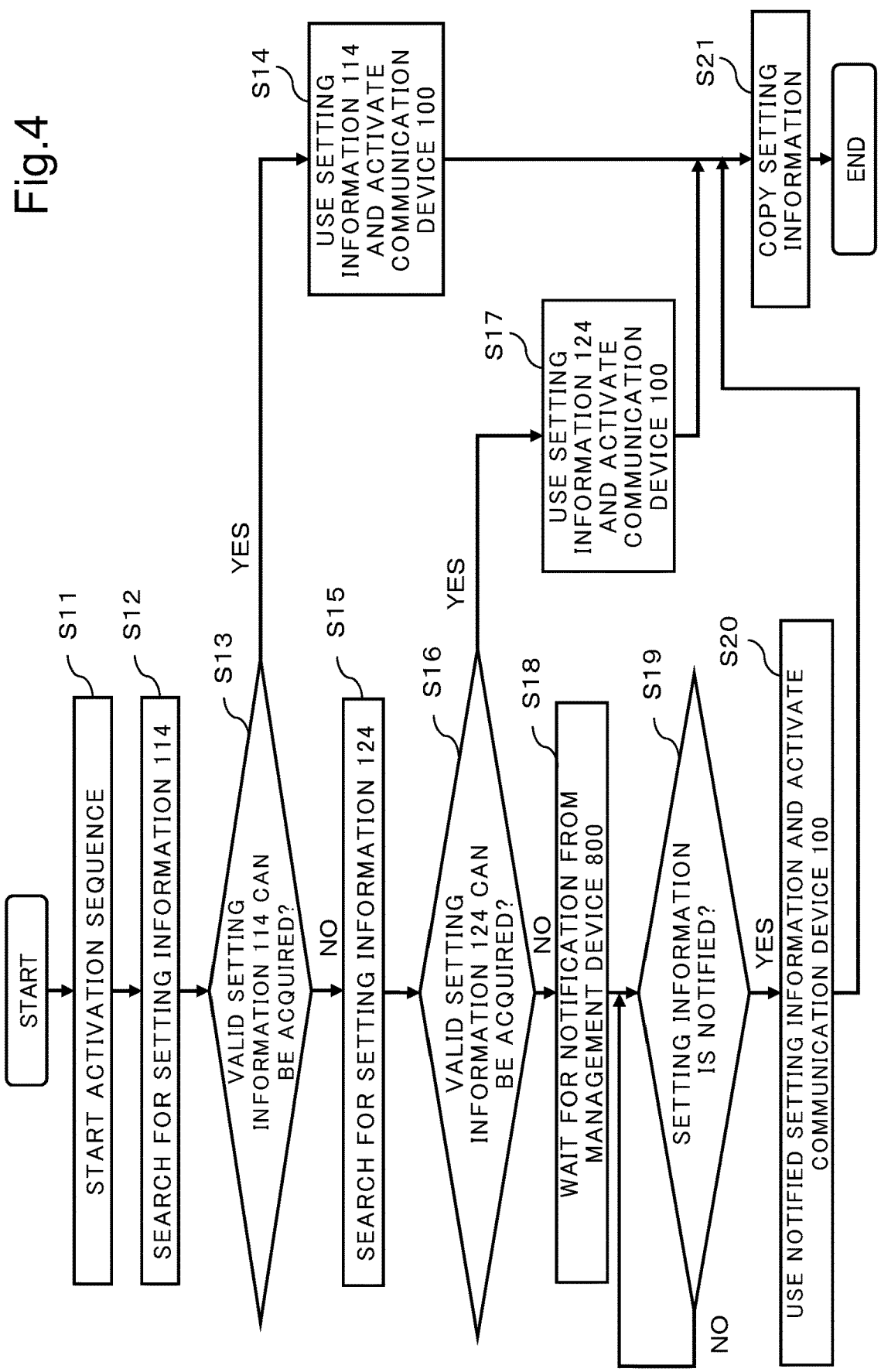
FIG. 4 is a flowchart illustrating an operation example of the communication device 100.

FIG. 4 is a flowchart illustrating an operation example of the communication device 100. When the activation sequence of the communication device 100 is started (Step S11 in FIG. 4), a CPU 112 searches for the setting information in the storage unit 113 (Step S12). When valid setting information 114 may be read out from the storage unit 113 (Step S13: YES), the CPU 112 selects the setting information 114 as the activation information, and uses the setting information 114 to activate the communication device 100 (Step S14). When the valid setting information 114 cannot be read out (Step S13: NO), the CPU 112 searches for setting information 124 in the storage unit 123 of a main function unit 120 (Step S15). When the valid setting information 124 may be acquired from the storage unit 123 (Step S16: YES), the CPU 112 selects the setting information 124 as the activation information, and uses the setting information 124 to activate the communication device 100 (Step S17).

When the valid setting information 124 cannot be acquired from the storage unit 123 (Step S16: NO), the communication device 100 is shifted to a state of waiting for a notification of the setting information from the management device 800 (Step S18). In Step S18, the CPU 112 may notify the management device 800 of the state of waiting for a notification of the setting information from the management device 800. Subsequently, the management device 800 that receives the notification may notify the communication device 100 of the setting information. Alternatively, in Step S18, an operator who is notified that the communication device 100 is not activated may operate the management device 800 in such a way as to notify the communication device 100 of the setting information.

When the setting information is notified from the management device 800 (Step S19: YES), the CPU 112 selects the notified setting information as the activation information, and uses the notified setting information to activate the communication device 100 (Step S20). In Step S20, the CPU 112 may restart the activation sequence from Step S11 after storing the setting information notified from the management device 800 in the storage units 113 and 123.

At the time of activation or after activation of the communication device 100 by the procedure in Step S14, S17, or S20, the setting information used for activation may be copied to the storage unit that does not store the setting information, by a procedure similar to Step S06 in FIG. 2 (Step S21). When the communication device 100 is activated by the setting information notified from the management device 800, the notified setting information may be copied to the storage units 113 and 123.

In the second example embodiment, when the valid setting information is not stored in either the control unit 110 or the main function unit 120, the communication device 100 is activated by using the setting information received from the management device 800. Thus, in other words, in the second example embodiment, even when neither the setting information 114 nor the setting information 124 is valid, the activation sequence of the communication device 100 may be continued. Thus, the communication device 100 of the present example embodiment is capable of suppressing a risk of stopping the activation sequence of the communication device 100, as compared to the first example embodiment.

Third Example Embodiment

Figure 5:
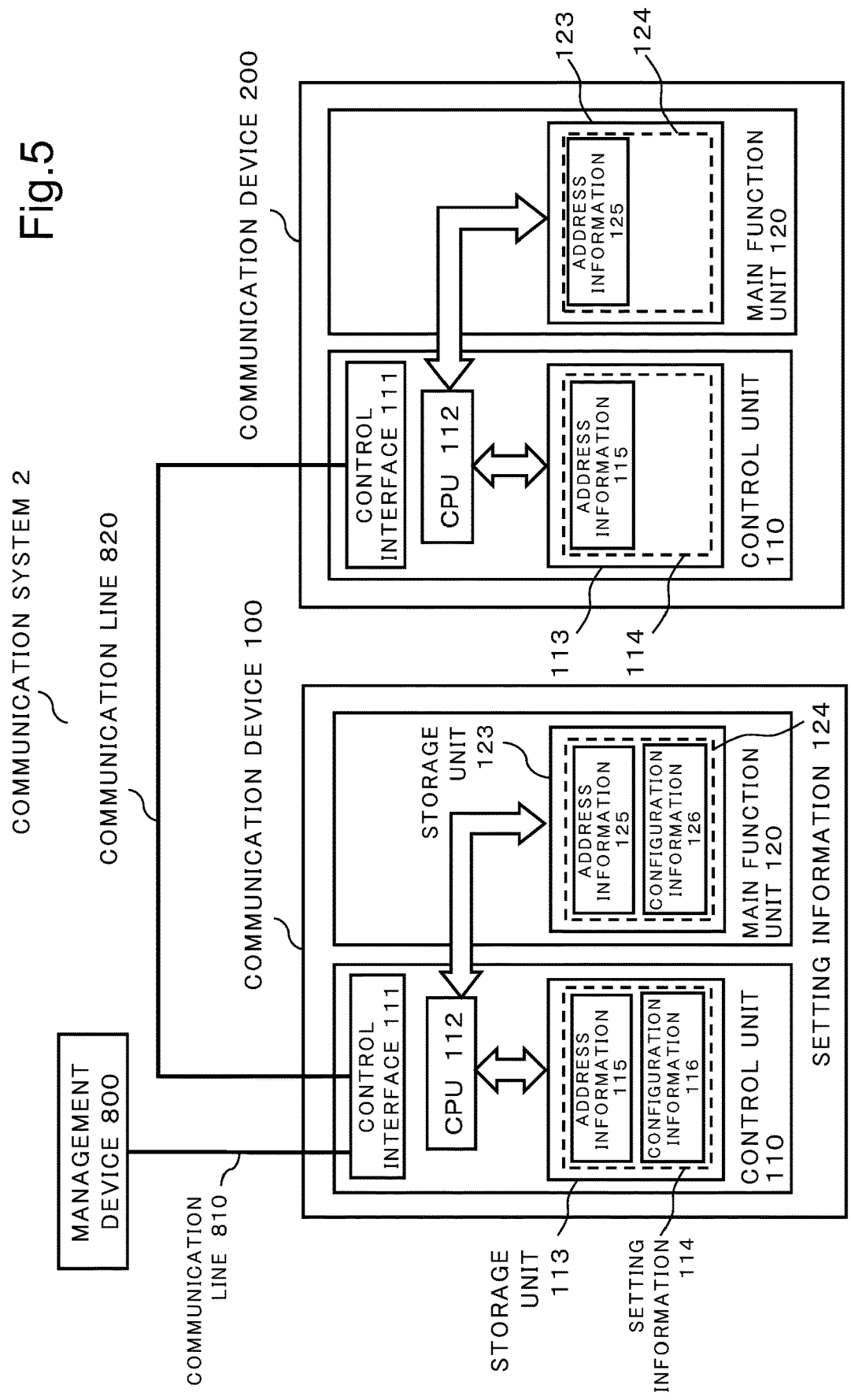
FIG. 5 is a block diagram illustrating a configuration example of a communication system 2 of a third example embodiment.

FIG. 5 is a block diagram illustrating a configuration example of a communication system 2 of a third example embodiment according to the present invention. The communication system 2 includes a communication device 100 and a communication device 200. The communication device 100 is described in the first example embodiment and the second example embodiment. A management device 800 may be connected to the communication device 100 via a communication line 810. The communication device 100 is connected to the communication device 200 via a communication line 820. The management device 800 is not directly connected to a control interface 111 of the communication device 200. The communication device 200 is different from the communication device 100 in that configuration information 116 and 126 are not stored. In other words, setting information 114 stored in the communication device 200 includes address information 115 relating to the control interface 111 of the communication device 200, but does not include the configuration information 116. Further, setting information 124 stored in the communication device 200 includes address information 125 relating to the control interface 111 of the communication device 200, but does not include the configuration information 126. The communication device 200 does not store the configuration information 116 and 126, and hence the communication device 200 is activated by using the configuration information notified from the communication device 100.

Figure 6:
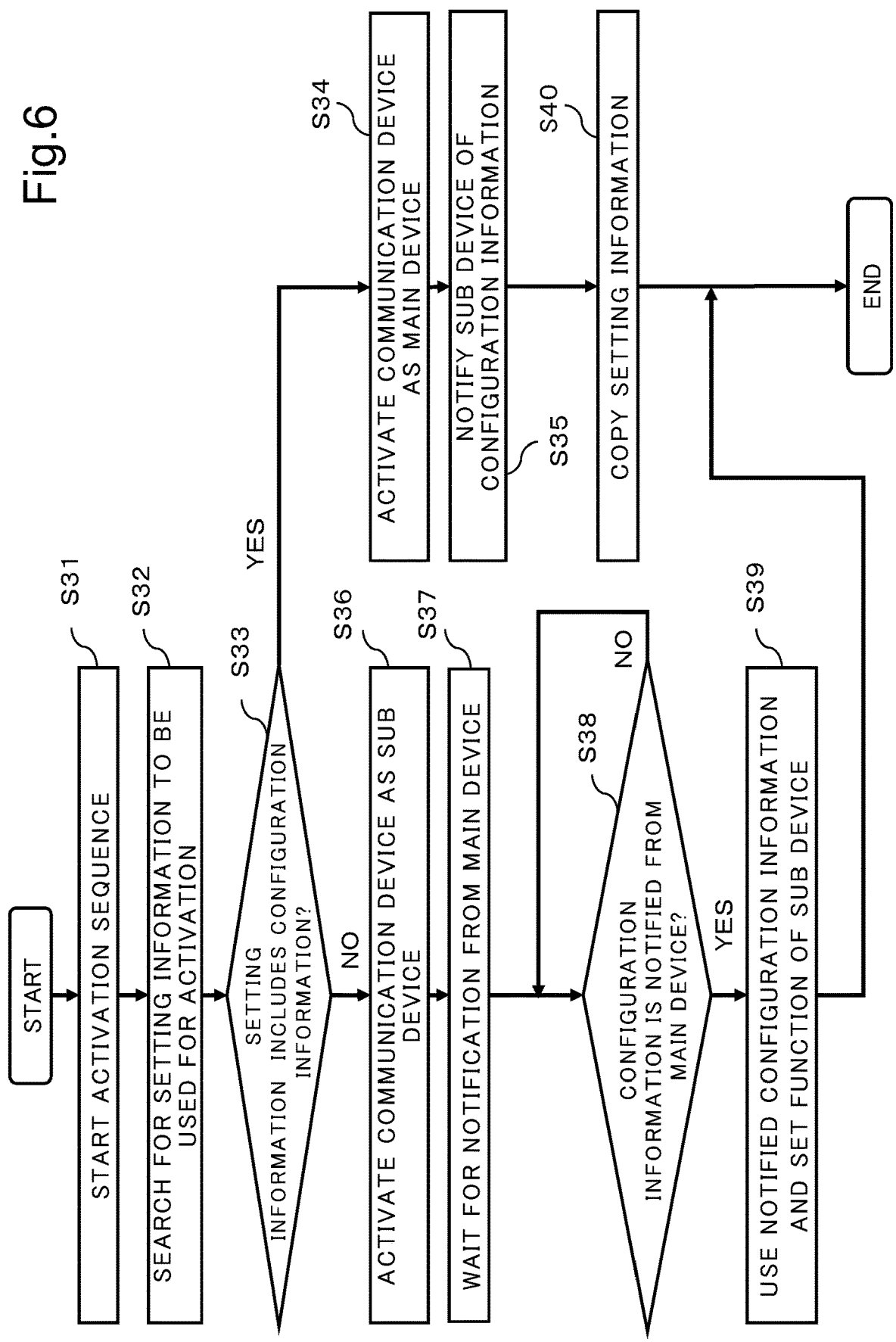
FIG. 6 is a flowchart illustrating an example of an activation procedure of a communication device used in the communication system 2.

FIG. 6 is a flowchart illustrating an example of an activation procedure of the communication devices 100 and 200 that are used in the communication system 2. The communication device is activated as the communication device 100 or the communication device 200, depending on whether the configuration information is stored therein. Hereinafter, in some cases, the communication device 100 that stores the configuration information is referred to as a main device, and the communication device 200 that does not store the configuration information is referred to as a sub device.

When the activation sequence is started due to power supply or re-activation (Step S31 in FIG. 6), a CPU 112 searches for the setting information to be used for activation (Step S32 in FIG. 6). The procedure of Steps S12 to S19 in FIG. 4 is applicable to a procedure in Step S32. The procedure to Step S32 is commonly shared by the communication devices 100 and 200. When the valid setting information is not stored in the communication device in Step S32 in FIG. 6, the CPU 112 may use the setting information notified via the control interface 111 to activate the communication device. For example, an operation by an operator or a request from the communication device 100 or 200 may cause the management device 800 to notify the communication device 100 of the setting information relating to at least one of the communication device 100 and the communication device 200. The communication device 100 may notify the communication device 200 of the setting information relating to the communication device 200 that is notified from the management device 800.

When the setting information to be used for activation that is searched for in Step S32 includes the configuration information (Step S33: YES), the communication device is activated as the main device (the communication device

100) by using the configuration information (Step S34). The activated main device notifies the sub device (the communication device 200) connected thereto via the control interface 111, of the configuration information (Step S35).

When the setting information relating to the communication device includes the address information, but does not include the configuration information in Step S33 (Step S33: NO), the communication device is activated as the sub device (the communication device 200) (Step S36). The activated sub device is shifted to a state of waiting for a notification of the configuration information from the main device (the communication device 100) connected thereto via the control interface 111 (Step S37). The address of the control interface 111 of the sub device is set according to the address information included in the setting information stored in the sub device. When the processing in Step S35 executed by the main device causes the main device to notify the sub device of the configuration information (Step S38: YES), the sub device sets a function of the sub device, according to the notified configuration information (Step S39). At the time of activation or after activation of the main device by the procedure in Step S34, the setting information used for activation may be copied to the storage unit that does not store the setting information, by a procedure similar to Step S06 in FIG. 2 (Step S40).

The difference between the communication device 100 and the communication device 200 is presence or absence of the configuration information stored in the storage units 113 and 123. Thus, hardware may be commonly shared by the communication device 100 and the communication device 200, and the configuration information may be stored only in hardware that is used as the communication device 100. With this, at the time of activation of a certain communication device, the communication device may be activated as the communication device 100 when the configuration information is stored in the storage unit 113 or 123, and the communication device may be activated as the communication device 200 when the configuration information is not stored.

The communication system 2 thus configured is also capable of suppressing activation of the communication device by unintended setting information. The reason for this is because, as the setting information to be used for activation is stored in the storage units 113 and 123 in the communication device, the communication devices 100 and 200 may be activated by the setting information stored in either of the storage units. Further, in the communication system 2, the same hardware is used to establish the communication system including the main device and the sub device, and thus the versatility of the hardware of the communication devices may be improved. Further, the main device notifies the sub device of the configuration information, and thus the main device is capable of managing additional installation or a change of a function of a sub device.

Fourth Example Embodiment

Figure 7:
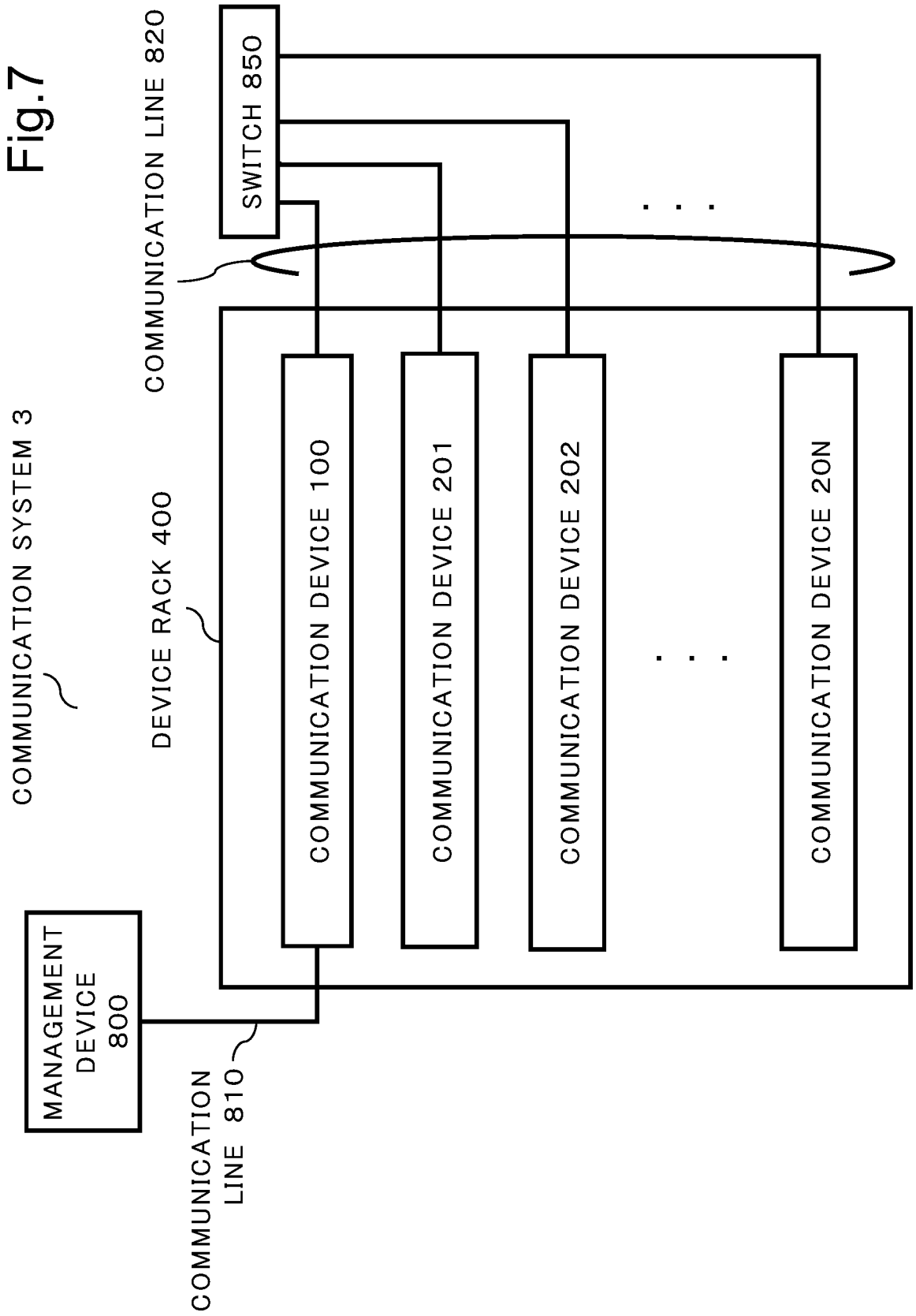
FIG. 7 is a block diagram illustrating a configuration example of a communication system 3 of a fourth example embodiment.

FIG. 7 is a block diagram illustrating a configuration example of a communication system 3 of a fourth example embodiment according to the present invention. The communication system 3 includes a management device 800, a communication device 100, N communication devices 201 to 20N, and a switch 850. N is a natural number. The communication device 100 and the communication devices 201 to 20N are stored on a device rack 400.

The communication device 100 is the main device described in the third example embodiment, and the communication devices 201 to 20N are the sub devices. The main device and the sub devices both include the configuration described in FIG. 1. The management device 800 is described in the second example embodiment. The management device 800 and the communication device 100 are connected to each other via a communication line 810. The communication device 100 and the communication devices 201 to 20N are connected to each other via the switch 850 and a communication line 820. The switch 850 is a piece of network equipment that connects the communication device 100 and the communication devices 201 to 20N to each other. The switch 850 is a layer 2 switch or a router, for example. The communication lines 810 and 820 are connected to a control interface 111 in each of the communication device 100 and the communication devices 201 to 20N.

The communication device 100 and the communication devices 201 to 20N may include a signal processing unit 122 having functions different from each other. Such signal processing units 122 are connected by optical fiber cables via an optical interface 121, thereby the main signal may be subjected to processing in which the functions of the signal processing units 122 are combined.

The configuration information stored in the communication device 100 in FIG. 7 includes information for setting a function to each of the communication device 100 and the communication devices 201 to 20N. The procedure of Steps S31 to S35 and S40 in FIG. 6 is applicable to the activation procedure of the communication device 100. When the valid setting information is not stored in the communication device 100, the communication device 100 may be activated as the main device by using the setting information notified from the management device 800. The procedure of Steps S16 to S20 in FIG. 4 is applicable to such procedure. The setting information that is notified from the management device 800 to the communication device 100 includes the configuration information relating to the communication device 100 and the communication devices 201 to 20N.

In the present example embodiment, the communication devices 201 to 20N are the sub devices. Thus, in the initial state, the configuration information is not stored in the communication devices 201 to 20N. Therefore, after the communication device 100 notifies the communication devices 201 to 20N of the configuration information, the functions are set to the communication devices 201 to 20N by using the configuration information. The procedure of Steps S36 to S39 is applicable to such procedure.

The configuration information stored in the communication device 100 is one file, and the functions of the communication device 100 and the communication devices 201 to 20N may be described in association with specifications (for example, settings for a hardware configuration or a hardware operation) in the file. In such a case, the communication device 100 extracts, from the file containing the configuration information, information associated with the communication device 100, and uses the extracted information for setting. Further, the communication device 100 transmits, to the communication devices 201 to 20N, the same file as the configuration information. Each of the communication devices 201 to 20N extracts, from the file containing the configuration information that is received from the communication device 100, information associated with each of the communication devices, and uses the extracted information for setting.

Similarly to the communication system 2 of the third example embodiment, in the communication system 3 of the present example embodiment, the same hardware may be used to establish a communication system including a main device and sub devices. Moreover, in the communication system 3 of the present example embodiment, the main device is capable of managing the functions of the plurality of sub devices.

Fifth Example Embodiment

Figure 8:
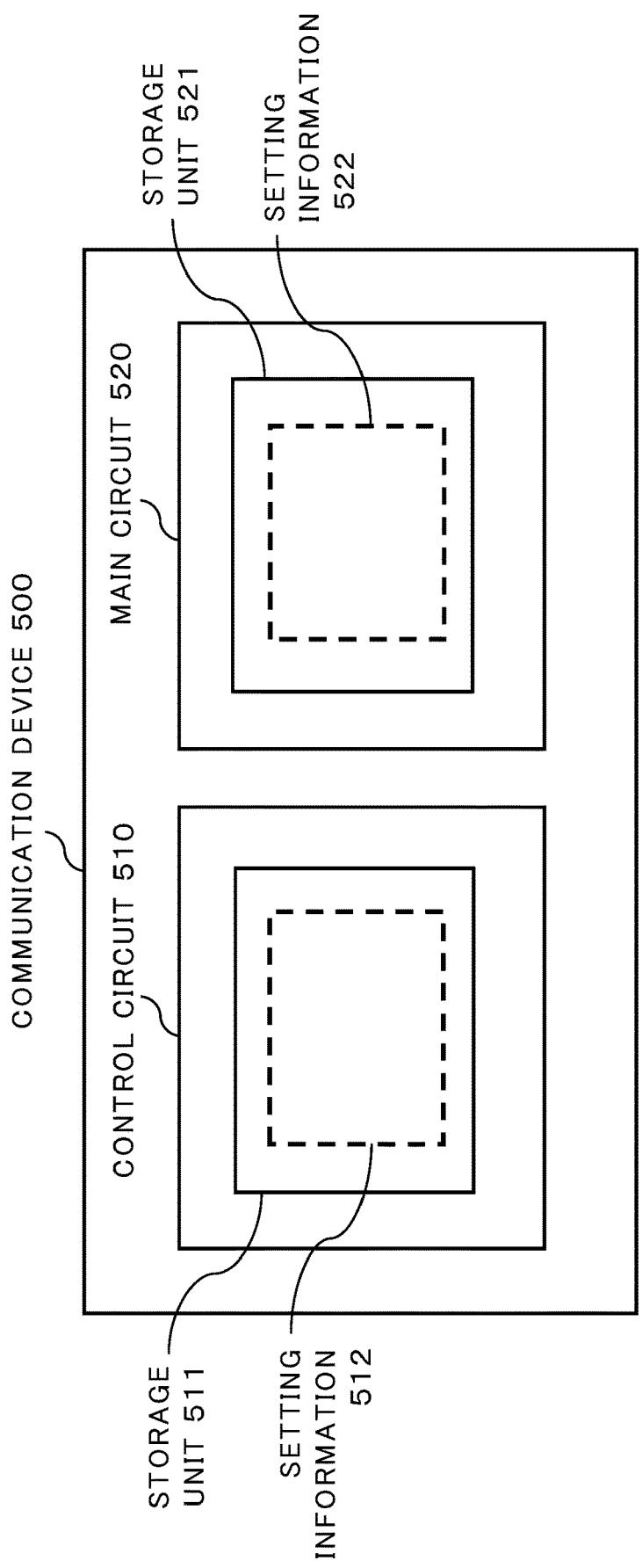
FIG. 8 is a block diagram illustrating a configuration example of a communication device 500 of a fifth example embodiment.
Figure 9:
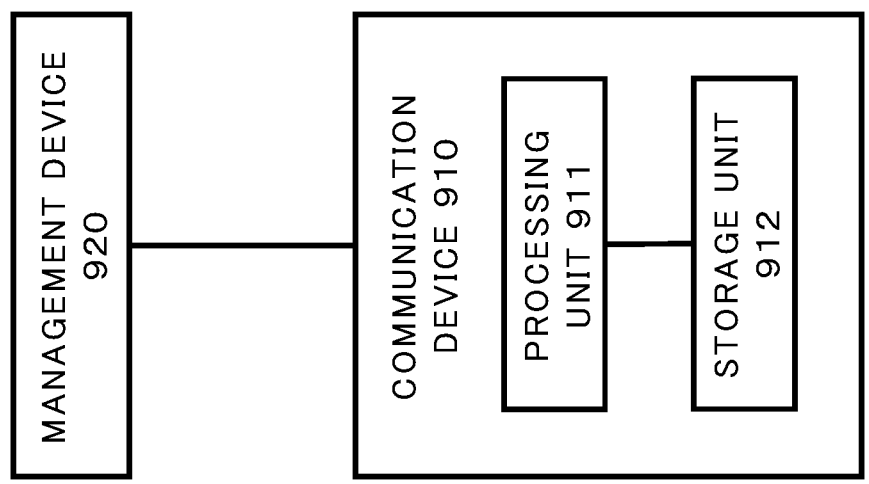
FIG. 9 is a block diagram illustrating a configuration example of a general communication system 900.

FIG. 8 is a block diagram illustrating a configuration example of a communication device 500 of a fifth example embodiment. The communication device 500 includes a control circuit 510 and a main circuit 520. The control circuit 510 includes a first storage unit 511 that stores, as first setting information 512, setting information used at the time of activating the communication device 500. The main circuit 520 includes a second storage unit 521 that stores the setting information as second setting information 522. The control circuit 510 and the main circuit 520 correspond to the control unit 110 and the main function unit 120 of the communication device 100 of the first example embodiment, respectively. The first storage unit 511 and the second storage unit 521 correspond to the storage unit 113 and the storage unit 123 of the communication device 100, respectively. The first setting information 512 and the second setting information 522 correspond to the setting information 114 and the setting information 124, respectively.

When the first setting information 512 that is valid may be acquired from the first storage unit 511, the communication device 500 is activated by using the first setting information 512. Further, when the first setting information 512 that is valid cannot be acquired from the first storage unit 511, the communication device 500 is activated by using the second setting information 522 that is valid and stored in the second storage unit 521.

The communication device 500 thus configured is capable of suppressing activation of the communication device 500 by unintended setting information. The reason for this is because the communication device 500 includes the first storage unit 511 and the second storage unit 521, which enables activation by using the setting information stored in the second storage unit 521 when the valid setting information cannot be acquired from the first storage unit 511.

Note that, a part or the entirety of the example embodiments described above may be described as in the following supplementary notes, but is not limited to the following.

(Supplementary Note 1)

A communication device including a control circuit and a main circuit, wherein
the control circuit includes a first storage means for storing, as first setting information, setting information being information to be used at a time of activating the communication device,
the main circuit includes a second storage means for storing the setting information as second information,
when the first setting information being valid can be acquired from the first storage means, the first setting information is selected as activation information to be used for activating the communication device, and activation is performed by using the activation information, and,
when the first setting information being valid cannot be acquired from the first storage means, the second setting information stored in the second storage means is selected as the activation information, and activation is performed by using the activation information.

(Supplementary Note 2)

The communication device according to Supplementary Note 1, wherein
a function of the communication device that is set when the first setting information is selected as the activation information and a function of the communication device that is set when the second setting information is selected as the activation information are identical to each other.

(Supplementary Note 3)

The communication device according to Supplementary Note 1 or 2, wherein,
when the first setting information is selected as the activation information, the first setting information is stored as the second setting information in the second storage means, and,
when the second setting information is selected as the activation information, the second setting information is stored as the first setting information in the first storage means.

(Supplementary Note 4)

The communication device according to any one of Supplementary Notes 1 to 3, further including
a first communication means for being connected to a remote device, wherein
when neither the first setting information stored in the first storage means nor the second setting information stored in the second storage means is valid, the communication device is shifted to a state of acquiring the setting information from the remote device connected to the first communication means.

(Supplementary Note 5)

The communication device according to any one of Supplementary Notes 1 to 4, further including:
an optical interface configured to input and output an optical signal; and
a signal processing means for processing a signal being input from the optical interface and outputting the processed signal to the optical interface.

(Supplementary Note 6)

The communication device according to any one of Supplementary Notes 1 to 4, wherein, when configuration information being information for setting a function of the communication device is included in the activation information, the communication device is activated as a main device.

(Supplementary Note 7)

The communication device according to Supplementary Note 6, further including
a second communication means for being connected to another communication device, wherein
when the communication device is activated as the main device, and the activation information includes configuration information for setting a function of the another communication device, the another communication device connected to the second communication means is notified of the configuration information according to the configuration information.

(Supplementary Note 8)

A communication system including: the communication device according to Supplementary Note 7; and the another communication device being able to be notified of the configuration information from the communication device according to Supplementary Note 7, being connected to each other.

(Supplementary Note 9)

A method for controlling a communication device, including:

selecting first setting information as activation information to be used for activating a communication device, and activating the communication device by using the activation information, when the first setting information being valid can be acquired from a first storage means for storing, as the first setting information, setting information being information to be used at a time of activating the communication device; and selecting, as the activation information, second setting information stored in a second storage means for storing the setting information as the second setting information, and activating the communication device by using the activation information, when the first setting information being valid cannot be acquired from the first storage means.

(Supplementary Note 10)

The method for controlling the communication device according to Supplementary Note 9, wherein a function of the communication device that is set when the first setting information is selected as the activation information and a function of the communication device that is set when the second setting information is selected as the activation information are identical to each other.

(Supplementary Note 11)

The method for controlling the communication device according to Supplementary Note 9 or 10, wherein, when the first setting information is selected as the activation information, the first setting information is stored as the second setting information in the second storage means, and, when the second setting information is selected as the activation information, the second setting information is stored as the first setting information in the first storage means.

(Supplementary Note 12)

The method for controlling the communication device according to any one of Supplementary Notes 9 to 11, wherein, when neither the first setting information nor the second setting information is valid, the communication device is shifted to a state of acquiring the setting information from a remote device being connected.

(Supplementary Note 13)

The communication device according to any one of Supplementary Notes 9 to 12, wherein a signal being input from an optical interface is processed, and the processed signal is output to the optical interface.

(Supplementary Note 14)

The method for controlling the communication device according to any one of Supplementary Notes 9 to 13, wherein, when configuration information being information for setting a function of the communication device is included in the activation information, the communication device is activated as a main device.

(Supplementary Note 15)

The method for controlling the communication device according to Supplementary Note 14, wherein, when the communication device is activated as a main device, and the activation information includes configuration information for setting a function of another communication device, the another communication device is notified of the configuration information according to the configuration information.

(Supplementary Note 16)

A recording medium having a control program for causing a computer to execute:

a procedure of selecting first setting information as activation information to be used for activating a communication device, and activating the communication device by using the activation information, when the first setting information being valid can be acquired from a first storage means for storing, as the first setting information, setting information being information to be used at a time of activating the communication device; and a procedure of selecting, as the activation information, second setting information stored in a second storage means for storing the setting information as the second setting information, and activating the communication device by using the activation information, when the first setting information being valid cannot be acquired from the first storage means.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the configurations described in the example embodiments are not necessarily mutually exclusive. The actions and the effects of the present invention may be achieved in a configuration by combining the entirety or a part of the example embodiments described above.

The functions and the procedures that are described in each of the example embodiments above may be implemented by causing the CPU included in the communication device of each of the example embodiments to execute a program. The program is recorded on a tangible and non-transitory recording medium. The recording medium may be a semiconductor memory included in the communication device or a fixed magnetic disk device, but is not limited thereto.

REFERENCE SIGNS LIST 1 to 3, 900 Communication system
100, 200, 201 to 20N, 500, 910 Communication device
110 Control unit
111 Control interface
112 Central processing unit (CPU)
113, 123 Storage unit
114, 124 Setting information
115, 125 Address information
116, 126 Configuration information
120 Main function unit
121 Optical interface
122 Signal processing unit
131, 132 Data bus
400 Device rack
510 Control circuit
511 First storage unit
512 First setting information
520 Main circuit
521 Second storage unit
522 Second setting information
800, 920 Management device
810, 820 Communication line
850 Switch
911 Processing unit
912 Storage unit

What is claimed is:

1. A communication device comprising a control circuit and a main circuit, wherein
the control circuit includes a first storage circuit configured to store, as first setting information, setting information being information to be used at a time of activating the communication device,
the main circuit includes a second storage circuit configured to store the setting information as second setting information,
when the first setting information being valid can be acquired from the first storage circuit, the first setting information is selected as activation information to be used for activating the communication device, and activation is performed by using the activation information,
when the first setting information being valid cannot be acquired from the first storage circuit, the second setting information stored in the second storage circuit is selected as the activation information, and activation is performed by using the activation information,
when configuration information, being information for setting a function of the communication device, is included in the activation information, the communication device is activated as a main device, and
when the configuration information is not included in the activation information, the communication device is activated as a sub device.

2. The communication device according to claim 1, wherein
a function of the communication device that is set when the first setting information is selected as the activation information and a function of the communication device that is set when the second setting information is selected as the activation information are identical to each other.

3. The communication device according to claim 1, further comprising
a first communication circuit configured to be connected to a remote device, wherein,
when neither the first setting information stored in the first storage circuit nor the second setting information stored in the second storage circuit is valid, the communication device is shifted to a state of acquiring the setting information from the remote device connected to the first communication circuit.

4. The communication device according to claim 1, further comprising:
an optical interface configured to input and output an optical signal; and
a signal processing circuit configured to process a signal being input from the optical interface and outputting the processed signal to the optical interface.

5. The communication device according to claim 1, further comprising
a second communication circuit configured to be connected to another communication device, wherein,
when the communication device is activated as the main device, and the activation information includes configuration information for setting a function of the another communication device, the another communication device connected to the second communication circuit is notified of the configuration information according to the configuration information.

6. A communication system comprising: the communication device according to claim 5; and the another communication device being able to be notified of the configuration information from the communication device according to claim 5, being connected to each other.

7. The communication device according to claim 1, wherein a function of the sub device is set according to the configuration information notified by the main device.

8. The communication device according to claim 1, wherein,
when the first setting information is selected as the activation information, the first setting information is stored as the second setting information in the second storage circuit, and
when the second setting information is selected as the activation information, the second setting information is stored as the first setting information in the first storage circuit.

9. A method for controlling a communication device, comprising:
selecting first setting information as activation information to be used for activating a communication device, and activating the communication device by using the activation information, when first setting information being valid can be acquired from a first storage circuit configured to store, as the first setting information, setting information being information to be used at a time of activating the communication device; and
selecting, as the activation information, second setting information stored in a second storage circuit configured to store the setting information as the second setting information, and activating the communication device by using the activation information, when the first setting information being valid cannot be acquired from the first storage circuit, wherein
when configuration information, being information for setting a function of the communication device, is included in the activation information, the communication device is activated as a main device, and
when the configuration information is not included in the activation information, the communication device is activated as a sub device.

10. The method for controlling the communication device according to claim 9, wherein
a function of the communication device that is set when the first setting information is selected as the activation information and a function of the communication device that is set when the second setting information is selected as the activation information are identical to each other.

11. The method for controlling the communication device according to claim 9, wherein, when neither the first setting information nor the second setting information is valid, the communication device is shifted to a state of acquiring the setting information from a remote device being connected.

12. The method for controlling the communication device according to claim 9, wherein a signal being input from an optical interface is processed, and the processed signal is output to the optical interface.

13. The method for controlling the communication device according to claim 9, wherein, when the communication device is activated as the main device, and the activation information includes configuration information for setting a function of another communication device, the another communication device is notified of the configuration information according to the configuration information.

14. The method for controlling the communication device according to claim 9, wherein, when the first setting information is selected as the activation information, the first setting information is stored as the second setting information in the second storage circuit, and when the second setting information is selected as the activation information, the second setting information is stored as the first setting information in the first storage circuit.

15. A tangible and non-transitory recording medium having a control program for causing a computer to execute:

a procedure of selecting first setting information as activation information to be used for activating a communication device, and activating the communication device by using the activation information, when first setting information being valid can be acquired from a first storage circuit configured to store, as the first setting information, setting information being information to be used at a time of activating the communication device; and a procedure of selecting, as the activation information, second setting information stored in a second storage circuit configured to store the setting information as the second setting information, and activating the communication device by using the activation information, when the first setting information being valid cannot be acquired from the first storage circuit, wherein when configuration information, being information for setting a function of the communication device, is included in the activation information, the communication device is activated as a main device, and when the configuration information is not included in the activation information, the communication device is activated as a sub device.

* * * * *